US012760189B2

(12) United States Patent
Chajda et al.

(10) Patent No.: US 12,760,189 B2
(45) Date of Patent: Oct. 13, 2026

(54) RHEOLOGY CONTROL ADDITIVE CONTAINING CYCLIC AMIDES

(71) Applicant: BYK-Chemie GmbH, Wesel (DE)

(72) Inventors: Dominika Beata Chajda, Wesel (DE); René Nagelsdiek, Hamminkeln (DE); Sylvia Bühne, Duisburg (DE); Bianca Morhenn, Krefeld (DE); André Tiemann, Duisburg (DE)

(73) Assignee: BYK-Chemie GmbH, Wesel (DE)

( * ) Notice: Subject to any disclaimer, the term of this patent is extended or adjusted under 35 U.S.C. 154(b) by 917 days.

(21) Appl. No.: 17/437,502

(22) PCT Filed: Mar. 12, 2020

(86) PCT No.: PCT/EP2020/056659
§ 371 (c)(1),
(2) Date: Sep. 9, 2021

(87) PCT Pub. No.: WO2020/182944
PCT Pub. Date: Sep. 17, 2020

(65) Prior Publication Data

US 2022/0145101 A1 May 12, 2022

(30) Foreign Application Priority Data

Mar. 14, 2019 (EP) .................................... 19162998

(51) Int. Cl.

| | |
|---|---|
| ***C09D 7/43*** | (2018.01) |
| ***C08G 18/22*** | (2006.01) |
| ***C08G 18/28*** | (2006.01) |
| ***C08G 18/32*** | (2006.01) |
| ***C08G 18/76*** | (2006.01) |
| ***C08K 5/21*** | (2006.01) |
| ***C08K 5/3412*** | (2006.01) |
| ***C09D 133/08*** | (2006.01) |
| ***C09D 175/04*** | (2006.01) |
| ***C09D 191/00*** | (2006.01) |

(52) U.S. Cl.
CPC ............. *C09D 7/43* (2018.01); *C08G 18/225* (2013.01); *C08G 18/2825* (2013.01); *C08G 18/283* (2013.01); *C08G 18/2835* (2013.01); *C08G 18/324* (2013.01); *C08G 18/7621* (2013.01); *C09D 133/08* (2013.01); *C09D 175/04* (2013.01); *C09D 191/00* (2013.01); *C08K 5/21* (2013.01); *C08K 5/3412* (2013.01)

(58) Field of Classification Search
CPC ...... C09D 7/43; C09D 133/08; C09D 175/04; C09D 191/00; C09D 175/02; C08G 18/225; C08G 18/2825; C08G 18/283; C08G 18/2835; C08G 18/324; C08G 18/7621; C08K 5/21; C08K 5/3412; C08K 5/20; C08L 75/02; C08L 75/04
See application file for complete search history.

(56) References Cited

U.S. PATENT DOCUMENTS

| | | | | |
|---|---|---|---|---|
| 4,529,763 A * | 7/1985 | Tamura | C08K 3/24 528/488 |
| 6,420,466 B1 | 7/2002 | Haubennestel et al. | |
| 6,426,143 B1 * | 7/2002 | Voss | H05K 3/182 174/254 |
| 7,250,487 B2 | 7/2007 | Tournilhac et al. | |
| 7,348,397 B2 | 3/2008 | Tournilhac et al. | |
| 9,617,371 B2 | 4/2017 | Leutfeld et al. | |
| 10,433,545 B2 * | 10/2019 | Karandikar | A01N 25/30 |
| 2010/0204430 A1 | 8/2010 | Marc et al. | |
| 2016/0185985 A1 * | 6/2016 | Leutfeld | C08G 18/28 524/199 |
| 2017/0037262 A1 | 2/2017 | Leutfeld et al. | |
| 2017/0044378 A1 * | 2/2017 | Leutfeld | C09D 7/43 |
| 2018/0237668 A1 * | 8/2018 | Mizori | C08G 59/686 |
| 2021/0171797 A1 * | 6/2021 | Kou | C08G 18/283 |

FOREIGN PATENT DOCUMENTS

| | | |
|---|---|---|
| DE | 2015172 A1 | 10/1971 |
| DE | 2822908 B1 | 7/1979 |
| DE | 19919482 A1 | 11/2000 |

(Continued)

OTHER PUBLICATIONS

International Preliminary Report on Patentability, International Patent Application No. PCT/EP2020/056659, dated May 19, 2021 (7 pages).
Giovanni Carlo Alfonso et al., "Adiabatic Polymerization of e-Caprolactam in Presence of Lithium Chloride, 1," Makromol. Chem and Physics, vol. 182, No. 3, Mar. 1, 19811, 929-939.
Emilio Biagini et al., "Adiabatic Polymerization of e-Caprolactam in Presence of Lithium Chloride, 3. Oligomer formation," Makromol. Chem and Physics, vol. 183, No. 9, Sep. 8, 1982, 2131-2140.
International Search Report and Written Opinion, International Patent Application No. PCT/EP2020/056659, dated Sep. 17, 2020 (12 pages).

*Primary Examiner* — Mark Eashoo
*Assistant Examiner* — Zhen Liu

(57) ABSTRACT

The invention relates to a composition comprising one or more urea-based compounds (A) having a number average molecular weight (Mn) between 350 g/mol and 30000 g/mol and one or more N-substituted caprolactam derivatives (B) according to formula (I) wherein R1 is an organic group having 1 to 2 carbon atoms and wherein R1 contains no oxygen atoms linked by single bonds.

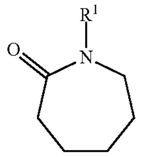

(I)

14 Claims, No Drawings

(56) References Cited

FOREIGN PATENT DOCUMENTS

| | | | |
|---|---|---|---|
| DE | 10241853 | B3 | 1/2004 |
| DE | 102007028890 | A1 | 5/2008 |
| DE | 102008059702 | A1 | 6/2010 |
| DE | 102015004640 | A1 | 10/2015 |
| EP | 0006252 | A1 | 1/1980 |
| EP | 1188779 | A1 | 3/2002 |
| EP | 1396510 | A1 | 3/2004 |
| EP | 2292675 | A1 | 3/2011 |
| EP | 3131941 | A1 | 2/2017 |
| GB | 1326124 | A | 8/1973 |
| JP | H 06-145344 | A | 5/1994 |
| JP | 2008297543 | A | 12/2008 |
| JP | 2012092330 | A | 5/2012 |
| WO | 2014111102 | A2 | 7/2014 |
| WO | 2015/046453 | A | 4/2015 |
| WO | 2015158407 | A1 | 10/2015 |
| WO | 2015158792 | A1 | 10/2015 |
| WO | 2015158794 | A1 | 10/2015 |
| WO | 2019/005596 | A1 | 1/2019 |
| WO | 2019190997 | A1 | 10/2019 |

* cited by examiner

RHEOLOGY CONTROL ADDITIVE CONTAINING CYCLIC AMIDES

The invention relates to a composition comprising a urea-based compound and a cyclic amide compound, and its use as rheology control agent. The invention further relates to a liquid composition comprising the urea-based compound and cyclic amide compound and a process of controlling the rheology of a liquid composition.

The rheology of liquid systems is often controlled using clays, e.g. bentonites and/or silicas, which may optionally be organically modified, hydrogenated castor oil, and polyamide waxes. A disadvantage of these rheology control auxiliaries is that they are mostly dry solids, which must be processed to a semi-finished form using solvents and shear forces, and/or introduced into the liquid system by means of targeted temperature control. Non-observance of these temperatures can lead not only to poor rheological performance, but also to detrimental properties of the products.

In case the liquid systems are coating compositions, these rheology control auxiliaries frequently lead to instances of clouding and haze in clear, transparent coatings. Moreover, operating with dry, powderous products, which cause dusts during processing, may be technologically unfavorable.

A liquid application alternative to these rheology control auxiliaries is provided by solutions of particular urea components as described for example in EP 1 188 779 A. Serving as solvent and/or carrier medium are typically polar/aprotic solvents. Alternatively, instead of classical organic diluents ionic liquids can be used as described in DE 102008059702 A. These are molten salts, which are fluid at moderate temperatures below 80° C.

Those liquid rheology control auxiliaries need to comply with a multiplicity of requirements. They have to show not only an improved rheological activity, but also a broad compatibility in application-relevant formulations as well (e.g. binders).

A further aspect, which should be noted in connection with rheology control auxiliaries provided in liquid form, is the storage stability thereof. For instance, prolonged storage times or elevated storage stress, for example in the case of storage with temperature variations, can lead to reduced storage stability, accompanied by reduced efficacy in the target systems. The urea components are supposed to display their rheology control effect in the application systems, for example by crystallization in these systems, whereas any thickening effect of the urea components or even crystallization in the storage form of the urea preparation is extremely undesirable. Therefore, it is desirable that rheology control auxiliaries have a good storage stability and will not easily precipitate on storage. Another relevant factor is their toxicological assessment in regard to exposure of humans and environment. All this parameters mentioned above limit the choice of adequate preparations. The choice of suitable rheology control auxiliaries is therefore difficult, since these especially have to be compatible with the later application systems, and meet further demands as well (for example no reaction of the solvent with the rheological control component or with other constituents of the application system).

There is therefore a need for rheology control auxiliaries that are improved in terms of rheological efficacy as well as concerning other parameters.

Thus, it is a particular object of the present invention to provide a high-quality rheology control agent of good effectiveness, which is employable in numerous application systems.

Surprisingly it has been found that these objectives can be achieved by the provision of a composition comprising one or more urea-based compounds (A) having a number average molecular weight (Mn) between 350 g/mol and 30000 g/mol and one or more N-substituted caprolactam derivatives (B) according to formula (I)

(I)

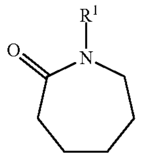

wherein $R^1$ is an organic group having 1 to 2 carbon atoms and wherein $R^1$ contains no oxygen atoms linked by single bonds.

The one or more urea-based compounds (A) are compounds, which comprise at least one urea-group. In one embodiment, the urea-based compounds are urea-urethane-compounds. In another embodiment, the urea component comprises molecules containing at least one urea group and at least one urethane group. In another embodiment, the urea component comprises molecules containing at least one urea group and at least two urethane groups. In another embodiment, the urea component comprises molecules containing at least two urea groups; in yet another embodiment, the urea component comprises molecules containing at least four urea or more than four urea groups. In a different embodiment, the urea component comprises molecules containing at least two urea groups and at least two urethane groups. In a different embodiment of the invention, urethane groups may even be absent.

Suitably, urea-based compounds according to claim 11 of WO 2015/158407, claim 13 of WO 2015/158407, claim 16 of WO 2015/158407 and claim 1 of EP 1396510 A1 are employed.

A preferred class of urea based compounds (A) can be described according to the following general formula (U-1)

R31-[R33-Z—R34-W—]$_n$—R32 (U-1)

where

R31 and R32 independently of one another and independently of each occurrence represent a branched or unbranched, saturated or unsaturated organic radical which contains 1 to 100 carbon atoms and which has not more than one urea group each and not more than one urethane group each, R33 and R34 independently of one another and independently of each occurrence represent branched or unbranched polyester radicals containing 1 to 300 carbon atoms and optionally containing ether groups, branched or unbranched polyether radicals containing 2 to 300 carbon atoms, branched or unbranched polyamide radicals containing 1 to 300 carbon atoms, polysiloxane radicals containing 3 to 100 silicon atoms, branched or unbranched C2 to C22 alkylene radicals, branched or unbranched C2 to C22 cycloalkylene radicals branched or unbranched C2 to C18 alkenylene radicals, C6 to C12 arylene radicals and/or branched or unbranched C7 to C22 arylalkylene radicals, Z and W independently of one another represent NH—CO—O and/or NH—CO—NH, in case of multiple occurrence of Z and W, Z and W represent independently the groups described above, n represents an integer from 1 to 150, preferably 2 to 150, in case of multiple occurrence of n, n independently represents an integer from 1 to 150, preferably 2 to 150.

In another preferred embodiment the urea based compound (A) is selected from the general formulas (U-2a), (U-2b), (U-2c), (U-2d), and (U-2e).

a polyamide radical having 1 to 100 amide groups and/or by a polysiloxane radical having 3 to 100 silicon atoms and/or by a polyester radical having 1 to 100 ester groups and optionally containing ether groups, in case of multiple occurrence of RP3, RP3 independently represents the above mentioned radicals and (U-2a)

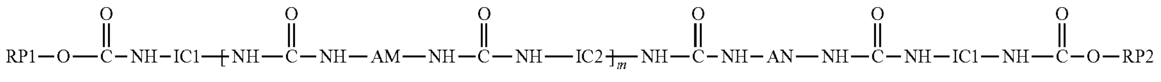

(U-2b)

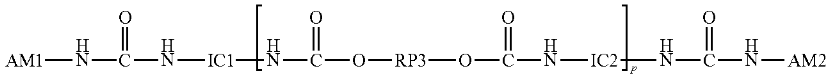

(U-2c)

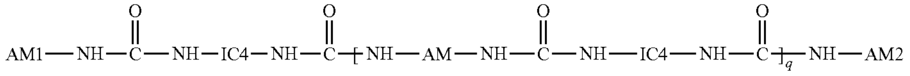

(U-2d)

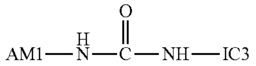

(U-2e)

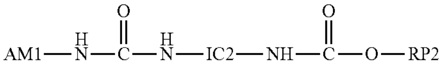

where

AM is selected from a linear or branched, saturated or unsaturated, aliphatic, cycloaliphatic, aromatic or aliphatic-aromatic organic radical having 2 to 50 C atoms, in case of multiple occurrence of AM, AM is independently selected from a linear or branched, saturated or unsaturated, aliphatic, cycloaliphatic, aromatic or aliphatic-aromatic organic radical having 2 to 50 C atoms, AM1 and AM2 independently of one another represent a linear or branched, saturated or unsaturated, aliphatic, aromatic or aliphatic-aromatic organic radical having 1 to 50 C atoms, in case of multiple occurrence of AM1 and AM2, AM1 and AM2 represent independently the radical described above, IC1 and IC2 independently of one another represent a linear or branched, saturated or unsaturated, aliphatic, aromatic or aliphatic-aromatic hydrocarbon radical having 2 to 40 C atoms, in case of multiple occurrence of IC1 and IC2, IC1 and IC2 represent independently the radical described above, IC3 represents a linear or branched, saturated or unsaturated, aliphatic, aromatic or aliphatic-aromatic hydrocarbon radical having 2 to 24 carbon atoms, in case of multiple occurrence of IC3, IC3 independently represents a linear or branched, saturated or unsaturated, aliphatic, aromatic or aliphatic-aromatic hydrocarbon radical having 2 to 24 carbon atoms, RP1 and RP2 independently of one another represent a linear or branched, saturated or unsaturated, aliphatic, aromatic or aliphatic-aromatic organic radical having 1 to 24 C atoms and/or by a polyether radical having 1 to 120 ether oxygen atoms and/or by a polyester radical having 1 to 100 ester groups and optionally containing ether groups, and/or by a polyamide radical having 1 to 100 amide groups, and/or by a polysiloxane radical having 3 to 100 silicon atoms, in case of multiple occurrence of RP1 and RP2, RP1 and RP2 represent independently the radicals described above, RP3 represents a linear or branched, saturated or unsaturated, aliphatic, aromatic or aliphatic-aromatic organic radical having 2 to 24 C atoms and/or by a (poly)ether radical having 1 to 120 ether oxygen atoms and/or by m is an integer from 0 to 20, preferably from 1 to 20, more preferably from 1 to 5. p represents 0 and/or 1. q is an integer from 0 to 20.

Preferably, the one or more urea based compounds (A) have a structure according to formula (U-2a) in which RP1 is selected from a hydrocarbyl group having 4 to 24 carbon atoms or a polyether segment having up to 50 alkylene oxide repeating units, preferably a segment Q-(O-AO), in which Q is a C1 to C18 alkyl or alkenyl group, AO is a group $C_2H_4$ or $C_3H_6$ and r is an integer of 2 to 35, IC1 and IC2 are preferably selected from one of the following bivalent groups (with "*" indicating the connection sites)

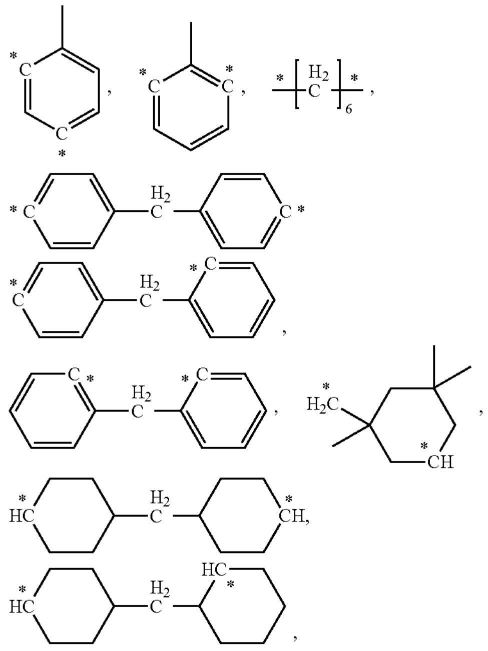

-continued

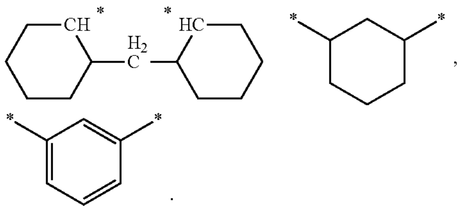

and in which AM is selected from a group $X_2H_4$, $C_3H_6$, $C_4H_8$, $C_6H_{10}$, $C_6H_{12}$, $C_6H_{10}$, —$CH_2$—$C_6H_4$—$CH_2$— or a group

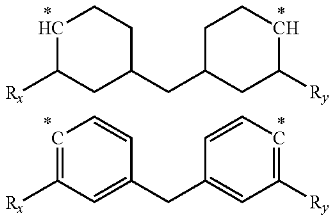

in which Rand $R_y$ represent H or CHs.

In a very preferred embodiment of (U-2a), IC1 is selected from

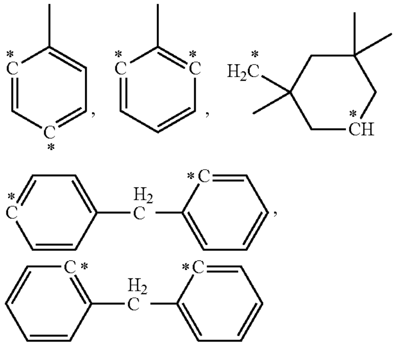

Even more preferably, IC1 and IC2 are selected from

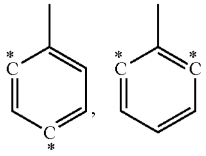

In a very preferred embodiment of (U-2a), AM is selected from $C_2H_4$ and —$CH_2$—$C_6H_4$—$CH_2$—.

In a very preferred embodiment of (U-2a), m is an integer from 0 to 10. In a special embodiment, m is an integer from 1 to 5.

In another preferred embodiment, the one or more urea based compounds (A) have a structure according to formula (U-2b) in which the preferred embodiments of IC1 and IC2 are as described for (U-2a), in particular a group $C_7H_6$ or a group —$C_6H_4$—$CH_2$—$C_6H_4$—, AM1 and AM2 are selected from a linear or branched, saturated or unsaturated C1 to C24 alkyl or alkenyl group or a group $C_6H_5$—$CH_2$—, and RP3 is selected from a hydrocarbyl group having 2 to 20 carbon atoms or a polyether segment having 1 to 40 ether oxygen atoms, preferably a polyether segment comprising 1 to 30 ethylene oxide and/or propylene oxide based repeating units.

In a further preferred embodiment, the one or more urea based compounds (A) have a structure according to formula (U-2c) in which the preferred embodiments of AM1 and AM2 are as described for (U-2b), the preferred embodiments of AM are as described for (U-2a), and IC4 is selected from a group as described for IC1 and IC2 or a urethane group containing segment having the structure

—[IC2-NH—(C═O)—O—RP3-O—(C═O)—NH—IC2]- in which IC2 is defined as described for (U-2a) and RP3 is defined as described for (U-2b).

For (U-2c), it is particularly preferred that IC4 is selected from a group $O_7H_6$, a group —$C_6H_4$—$CH_2$—$C_6H_4$—, and a group

—[IC2-NH—(C═O)—O—RP3-O—(C═O)—NH—IC2]- in which IC2 represents a group $C_7H_6$ or a group —$C_6H_4$—$CH_2$—$O_6H_4$— and RP3 represents a polyether segment comprising 1 to 30 ethylene oxide and/or propylene oxide based repeating units.

In a preferred embodiment of (U-2c), q is an integer from 0 to 15, even more preferably from 0 to 7 and most preferably from 0 to 4, like from 1 to 4.

In a preferred embodiment, at least 50 wt. % of all urea based compounds (A) of the inventive composition have a structure according to formula (U-2a) or (U-2c).

In a very preferred embodiment, at least 50 wt. % of all urea based compounds (A) of the inventive composition have a structure according to formula (U-2a) and m is 0 or m is 1 to 5; very preferably, m is 0.

In a preferred embodiment, the one or more urea-based compounds (A) are urea urethanes and 95-100% by weight of (A) contain at least one molecule segment of the general formula (U-3a)

—O—CO—NH—Y1-NH—CO—NH (U-3a)

where

Y1 represents a saturated or unsaturated, branched or unbranched hydrocarbon radical containing 6 to 20 carbon atoms, in case of multiple occurrence of Y1, Y1 independently represents a saturated or unsaturated, branched or unbranched hydrocarbon radical containing 6 to 20 carbon atoms and in each case contains no molecule segment of the general formula (U-3b)

—O—CO—NH—Y2-NH—CO—O— (U-3b)

where

Y2 represents a saturated or unsaturated, branched or unbranched hydrocarbon radical containing 6 to 20 carbon atoms. In case of multiple occurrence of Y2, Y2 independently represents a saturated or unsaturated, branched or unbranched hydrocarbon radical containing 6 to 20 carbon atoms.

The urea-based compounds may be prepared in a known way by reaction of corresponding isocyanates with amines, e.g. amines or isocyanates as described in claim 14 of WO 2015 158 407. Preparation processes for urea compounds of this kind are described in more detail for example in U.S. Pat. No. 7,250,487 B2, U.S. Pat. No. 7,348,397 B2, EP 13 96 510 A1, EP 2 292 675 A1.

Preferably, the urea-based compounds have a number average molecular weight (Mn) of at least 400 g/mol. More preferably, the number average molecular weight is above 500 g/mol, even more preferably above 650 g/mol, and most preferably above 800 g/mol. Furthermore, the number average molecular weight (Mn) of the one or more urea-based compounds is preferably below 20000 g/mol, more preferably below 10000 g/mol, and most preferably below 8000 g/mol. Preferably, the number average molecular weight (Mn) is between 500 g/mol and 30000 g/mol, more preferably between 650 g/mol and 20000 g/mol, even more preferably between 800 g/mol and 8000 g/mol and most preferably between 800 g/mol and 5000 g/mol.

In a further preferred embodiment, the number average molecular weight is at least 1500 g/mol, preferably between 1500 g/mol and 20000 g/mol and more preferred between 1500 g/mol and 8000 g/mol and even more preferred between 1500 and 5000 g/mol.

The number and weight average molecular weight can be determined by gel permeation chromatography (eluent: solution of lithium bromide (content 5 g/1) in dimethylacetamide, standard: polymethylmethacrylate, column temperature: 50° C.) according to DIN 55672 part 2 (year: 2016). Alternatively, the number average molecular weight may be determined by calculation. Additionally, the number average molecular weight for small molecules up to 1000 g/mol may be determined by other methods such as mass spectroscopy or nuclear magnetic resonance spectroscopy. The polydispersity D is calculated by dividing the weight average molecular weight $M_w$ by the number average molecular weight $M_n$.

$R^1$ of the one or more N-substituted caprolactam derivatives (B) according to formula (I) is an organic group having 1 to 2 carbon atoms and contains no oxygen atoms linked by single bonds. In one embodiment, $R^1$ does not contain any heteroatoms at all. In a different embodiment, $R^1$ does comprise heteroatoms. In this case, it is preferred that $R^1$ comprises an oxygen-atom linked by a double bond. It is most preferred that $R^1$ comprises one oxygen-atom linked by a double bond. Suitably, the one oxygen-atom linked by a double bond is part of a carbonyl-group.

In another embodiment, $R^1$ is an organic group having 1 carbon atom. In an even different embodiment, $R^1$ is an organic group having 2 carbon atoms. In a preferred embodiment, $R^1$ is a hydrocarbyl group having 1 carbon atom or having 2 carbon atoms.

In a preferred embodiment, the caprolactam derivatives (B) comprise at least one of N-methylcaprolactam, N-ethylcaprolactam, N-vinylcaprolactam, N-acetylcaprolactam and mixtures thereof.

The composition suitably comprises 3 to 75% by weight of the one or more urea based compounds (A) having a number average molecular weight (Mn) between 350 g/mol and 30000 g/mol and 25 to 97% by weight of the one or more N-substituted caprolactam derivatives (B) wherein the % by weight are calculated on the sum of (A) and (B). Preferably, the composition comprises 10 to 65% by weight of the one or more urea based compounds (A), more preferably 15 to 60% by weight, and most preferably 20 to 55% by weight. The one or more N-substituted caprolactam derivatives (B) are preferably present in an amount of 35 to 90% by weight, more preferably 40 to 85% by weight, and most preferably 45 to 80% by weight, calculated on the sum of (A) and (B).

The composition suitably comprises 3 to 75% by weight of the one or more urea based compounds (A) having a number average molecular weight (Mn) between 350 g/mol and 30000 g/mol and 10 to 97% by weight of the one or more N-substituted caprolactam derivatives (B) wherein the % by weight are calculated on the sum of the total composition. Preferably, the composition comprises 5 to 60% by weight of the one or more urea based compounds (A), more preferably 10 to 55% by weight and most preferably 15 to 50% by weight. The one or more N-substituted caprolactam derivatives (B) are preferably present in an amount of 15 to 90% by weight, more preferably 20 to 85% by weight, even more preferably 25 to 80% by weight and even most preferably 40 to 75% by weight, calculated on the sum of the total composition.

In one embodiment, the composition further comprises one or more organic diluents (C) different from N-substituted caprolactam derivatives (B). The organic diluent (C) does not contain urea groups, and typically comprises an aprotic polar diluent. The organic diluent includes volatile organic solvents as well as non-volatile organic solvents.

Examples of suitable diluents include amides, preferably cyclic amides (i. e. lactams) with exception of those falling under the definition of (B), non-cyclic dialkyl amides of mono- and difunctional carboxylic acids, sulfoxides, preferably dimethyl sulfoxide and/or ionic liquids. Particularly suitable are diluents selected from the group of N-alkyllactams, preferable N-alkyl butyrolactams and even more preferred N-alkyl substituted butyrolactams, wherein the alkyl groups are selected from $C_1$ to $C_{12}$ alkyl groups.

Examples of N-alkylbutyrolactams are N-methylbutyrolactam, N-ethylbutyrolactam, N-butylbutyrolactam, N-octylbutyrolactam and N-hydroxyethyl butyrolactam. Examples of linear amides are N,N-dimethylformamide, N,N-dimethylacetamide, N,N-dialkylamidoalkyl esters, N,N-dialkylamidoalkyl ethers, hexamethylphosphoric triamide and acylmorpholines. Preferred examples of these are also N,N-dimethylamidoalkyl ester, N,N-dimethylamidoalkyl ether, N-formylmorpholine and N-acetylmorpholine.

In another preferred embodiment, the one or more organic diluents (C) of the composition are ionic liquids. In the context of the present invention, so-called ionic liquids are organic salts with a melting point below or equal to 80° C.

Examples of ionic liquids are substituted imidazolium salts, e.g. 1-ethyl-3-methylimidazolium acetate, 1-ethyl-3-methylimidazolium acetate, 1-ethyl-3-methylimidazolium-ethylsulfate, 1-butyl-3-methylimidazolium ethylsulfate, 1-ethyl-3-methylimidazoliumthiocyanate and 1-butyl-3-methylimidazolium thiocyanate. Ionic liquids may be combined with the non-ionic organic diluents mentioned above.

Generally, the composition may comprise one or more salts. In some embodiments, the composition according to the present invention comprises one or more salts (D), which are different from the ionic liquids and which have a melting point higher than 80° C.

The salts according to the present invention are containing cations of elements of the main groups I and II of the Periodic Table of the Elements (alkali and alkaline earth metals) or ammonium ions (incl. substituted ammonium ions, e.g., alkylammonium ions) and mixtures thereof. Preferred salts are such containing lithium, calcium or magnesium, particularly preferably lithium and calcium cations, preferably in chloride, acetate, and/or nitrate form. In some embodiments, the salts contain as anions preferably monovalent anions, particularly preferably halides, pseudohalides, formate, acetate and/or nitrate, most particularly preferably chloride, acetate and/or nitrate.

Particularly preferred as salts are inorganic lithium salts, such as lithium chloride or lithium nitrate, as well as ammonium salts, for example alkyl ammonium salts, in particular quaternary ammonium salts, such as tetra-alkyl ammonium halides.

The composition suitably comprises 0 to 70% by weight of the one or more organic diluents (C) and 0 to 15% by weight of the one or more salts (D), wherein the % by weight are calculated on the weight of the composition. Preferably, the composition comprises 0 to 50% by weight of the one or more organic diluents (C), more preferably 0 to 30% by weight and most preferably 0 to 20% or 0 to 10% by weight. In one embodiment, the composition does not comprise an organic diluent (C). The composition suitably comprises one or more salts (D) in an amount of 0 to 15% by weight, more preferably 0 to 8% by weight, even more preferably 0 to 5% by weight and most preferably, 0 to 3% by weight. In one embodiment, the composition does not comprise a salt (D).

Generally, the composition is a solution.

Preferably, the composition comprising (A) and (B) and optionally (C) and/or (D) is a composition which is suitable to control the rheology of a liquid formulation.

In a further embodiment, the present invention relates to the use of the composition for controlling the rheology of a liquid composition. The term "liquid composition" according to the present invention denotes a composition, being liquid at 23° C. and 100 kPa.

The composition of the present invention may be employed to control the rheology of various kinds of liquid compositions. Therefore, in one embodiment, the liquid composition may be an aqueous composition. The primary or even the only liquid diluting agent of a liquid aqueous composition is water. Additionally, the aqueous composition may comprise certain amounts of organic diluents. The organic diluents are the same or different from the organic diluents (C). It is preferred that a liquid aqueous composition comprises less than 35% by weight, preferably less than 25% by weight, more preferably less than 20% by weight and most preferably less than 10% or even less than 5% by weight of organic diluents, calculated on the total weight of the liquid composition. In a special embodiment, the liquid aqueous composition does not contain organic diluents at all.

In general, a liquid aqueous composition comprises at least 10%, preferably at least 15%, more preferably at least 20% by weight of water. In certain cases, a liquid aqueous composition can comprise at least 25%, more preferably at least 30% by weight of water. In general, a liquid aqueous composition comprises at most 90% by weight of water, such as up to 80% or up to 70% by weight. In special embodiments, the liquid aqueous composition comprises up to 95%, or even up to 97, 98, or 99% by weight of water.

In another embodiment, the liquid composition may be a non-aqueous composition. A non-aqueous composition is essentially free from water. That denotes a liquid composition suitably comprising between 0.0 and less than 10.0% by weight of water, preferably between 0.0 and 7.0% by weight of water, calculated on the total weight of the liquid composition. More preferably, the non-aqueous liquid composition comprises less than 5.0% by weight of water. For example, the liquid composition comprises less than 3.0% by weight or less than 1.0% by weight of water, calculated on the total weight of the liquid composition.

Suitably, the liquid composition is selected from a coating composition, a clear coat composition, a lacquer, a varnish, a plastic formulation, a pigment paste, an effect pigment paste, a polymer formulation, a sealant formulation, a cosmetic formulation, a homecare or industrial care formulation (including perfume and fragrance formulations), a ceramic formulation, an adhesive formulation, a liquid formulation for use in gas and oil production, a composition for the manufacture of electrical components and circuits, a liquid formulation for use in energy storage media, a cleaning agent, a potting compound, a building material formulation, a lubricant, a filling compound, a wax emulsion, a metal-working fluid, a metal-processing product, a liquid composition in the form of a spraying agent, a so-called deposition aid (e.g., for use in plant protection agents or for the general purpose of drift reduction), a ink, a printing ink and a ink jet ink or a composition that may be used as corrosion protection in the field of marine and protective coatings and mixtures thereof.

Further liquid compositions wherein the composition according to the present invention can be used are solvent-based or solvent-free paints, printing inks and inks and lacquers as e.g. lacquers for varnishing of plastics, wire enamels, floor coatings, coating compositions for coating foodstuffs and seeds, and as so-called color resists, which are used for color filters, for example in flat panel displays such as liquid-crystal displays. The field of application lacquers also includes pasty materials which generally have a very high proportion of solids and a small proportion of liquid components, for example so-called pigment pastes or also pastes based on effect pigments, for example metal effect pigments such as, for example, aluminum pigments, silver pigments, brass pigments, zinc pigments, copper pigments, bronze pigments such as gold bronzes, fire-dyed bronzes or iron oxide aluminum pigments. The effect pigments also include, for example, interference pigments or pearlescent pigments such as, for example, metal oxide mica pigments, fish silver, bismuth oxide chloride or basic lead carbonate.

The plastic formulations can be liquid or non-liquid starting materials to produce plastic materials, which are preferably converted into a duromer by a chemical cross-linking process ("curing"). Preferred plastic preparations are unsaturated polyester resins, vinyl ester resins, acrylate resins, epoxy resins, polyurethane resins, formaldehyde resins (such as melamine-formaldehyde or urea-formaldehyde). These can be cured under very different conditions, e.g. at room temperature (cold-curing systems) or at elevated temperature (hot-curing systems), optionally with application of pressure ("closed mold" application, sheet molding compound or bulk molding compound). The plastic formulations also include PVC plastisols.

The cosmetic preparations can be various liquid compositions, which are used in the so-called personal care or healthcare sector, e.g. lotions, creams, pastes such as, for example, toothpaste, foams such as, for example, shaving foam, gels such as, for example, shaving gels, shower gels or active ingredients in gel formulations, hair shampoos, liquid soaps, nail varnishes, lipsticks and hair dyes.

The so-called wax emulsions are preferably dispersions of solid waxes in particulate form at room temperature in water or an organic medium.

The building material formulations may be liquid or paste-like materials, which are used in the construction sector and solidify after curing. Examples are hydraulic binders such as concrete, cement, mortar, tile glue and plaster.

The metal working fluids may be cutting liquids, drilling fluids (such as are used in metal processing), or forging fluids or lubricants in general. Potential other areas are release agents (often in the form of aqueous emulsions, for example, aluminum die casting and foundry applications), foundry washes (foundry coatings) and liquids for the surface treatment of metals (for example "surface finishing", surface treatment and plating).

The lubricants are means, which are used for lubrication, that is to say, which serve to reduce friction and wear, as well as to provide power, cooling, vibration dampening, sealing action and corrosion protection; liquid lubricants being preferred here.

Cleaning agents can be used to clean a wide range of objects, for example in the area of homecare or industrial care. They effect or assist the removal of impurities, residues and attachments. The cleaners also include detergents (primarily for cleaning textiles, their precursors, leather, and dish), and personal care products. Formulations containing perfumes and other fragrances (either as liquid raw materials or in encapsulated form), e.g., as perfume gels, also belong to this area of application.

Liquid formulations used for gas and oil production are formulations used to develop and exploit a deposit. Drilling fluids or "drilling muds" are preferred examples. Another application example are liquids used to prepare or perform a hydraulic fracturing process.

The adhesives can be all adhesive materials which are liquid under processing conditions and which can join parts by surface adhesion and internal strength.

The liquid compositions of the invention may further comprise customary additives. Examples of additives are antiblocking agents, stabilizers, antioxidants, pigments, wetting agents, dispersants, emulsifiers, additional rheology additives, UV absorbers, free-radical scavengers, slip additives, defoamers, adhesion promoters, leveling agents, waxes, nanoparticles, film-forming auxiliaries, and flame retardants. Preferred additives are wetting agents, dispersants and/or emulsifiers and rheology additive which are different from the composition of the present invention, such as clay based thickeners (including organoclays), (poly) amides, polysaccharides (like cellulose derivatives, guar, xanthan), polyacrylates, or associative thickeners. In an example, the inventive composition can be used in combination with other thickeners affecting the low, medium, and/or high shear performance of the liquid composition that needs to be modified concerning its rheological behavior.

In a preferred embodiment, the invention also refers to a liquid composition, which is liquid at 23° C., and comprises the composition according to the present invention.

The liquid composition suitably comprises 0.02 to 6.00% by weight of the one or more urea-based compounds (A) and 0.05 to 8.00% by weight of the one or more N-substituted caprolactam derivatives (B), wherein the % by weight are calculated on the weight of the liquid composition. Preferably, the liquid composition comprises 0.05 to 4.00% by weight of the one or more urea-based compounds (A), more preferably 0.10 to 3.00% by weight and most preferably 0.20 to 2.50% by weight. The one or more N-substituted caprolactam derivatives (B) are preferably present in an amount of 0.05 to 6.00% by weight, more preferably 0.10 to 5.00% by weight and most preferably 0.20 to 4.00% by weight, such as in an amount of 0.40 to 3.00% by weight.

The liquid composition suitably comprises 0.0 to 6.0% by weight of the one or more organic diluents (C) and 0.0 to 1.5% by weight of the one or more salts (D), wherein the % by weight are calculated on the weight of the liquid composition. Preferably, the composition comprises 0.0 to 4.0% by weight of the one or more organic diluents (C), more preferably 0.0 to 2.5% by weight and most preferably 0.0 to 1.5% or 0.0 to 1.0% by weight. In one embodiment, the composition does not comprise an organic diluent (C).

In the liquid composition, the one or more salts (D) are preferably present in an amount of 0.0 to 1.0% by weight, more preferably 0.0 to 0.8% by weight, even more preferably 0.0 to 0.6% by weight and most preferably, 0.0 to 0.4% or 0.0 to 0.2% by weight. In one embodiment, the composition does not comprise a salt (D).

Furthermore, the composition may suitably be used for controlling the rheology of a coating and/or paint composition. In a different embodiment, the invention relates to the use of the composition for controlling the rheology of the liquid compositions mentioned above.

In a further embodiment, the invention also relates to a process for controlling the rheology of a liquid composition comprising the steps of providing the composition according to the present invention, providing a liquid composition and mixing the composition according to the present invention and the liquid composition. Suitable liquid compositions are the liquid compositions as aforementioned amongst others. The step of mixing the components may be executed according to current processes known by the person skilled in the art. This may involve mixing by manual or electrical means inter alia. Mixing is combining the compositions and exerting shear force on the combined compositions.

In another embodiment, the invention relates to a coated article, wherein at least a part of the surface is coated with the liquid composition according to the present invention. In a different embodiment, the coated article is obtainable by the steps of providing an article, providing the liquid composition according to the present invention and coating at least a part of the surface of the article with the liquid composition.

Furthermore, in an even different embodiment the invention relates to a coated article, wherein at least a part of the surface of the article is coated with the liquid composition according to the present invention and wherein the liquid composition is hardened. In another embodiment, the coated article is obtainable by the steps of providing an article, providing the liquid composition according to the present invention, coating at least a part of the surface of the article with the liquid composition and hardening the liquid composition.

Suitable articles are all three-dimensional objects, irrespective of their size and volume and whether they are mobile or immobile. Illustrative, but not limiting examples are building interiors and exteriors, flooring, furniture, vehicles used for transportation (like automobiles, bikes, boats, aircrafts, agricultural machines, and all kinds of freight vehicles), bridges and tunnels, machinery and production equipment, electrical devices, cans, metal coils, wires, containers, household articles and hardware, pulp and paper, as well as all kind of articles made of wood, metal, plastics or glass (e.g., for functional or ornamental use). The meaning of the wording "coating" is well-known to the person skilled in the art. In this context, it relates to the application of the liquid composition on the surface or other areas of said article to cover it at least partly or even encasing the article in its entirety. In this case, the liquid composition toughens or hardens after it has been applied to said article. Hardening means converting the liquid composition into a solid state. This can be achieved by evaporation of liquid diluents (physical drying) or by chemical cross-linking reaction (curing), and by combinations thereof.

EXAMPLES

N-Acetylcaprolactam, N-methylcaprolactam, N-ethylcaprolactam, and N-vinylcaprolactam can be purchased from Sigma-Aldrich or synthesized according to state of the art literature, e.g., DE 2015172, *Aust. J. Chem.* 1976, 29, 2651, *ARKIVOC* 2002 (ii) 56-63 (F. Cuiban et al., "N-Substituted derivatives of ε-caprolactam and their thermal and chemical behavior"), and *Chin. J. Chem.,* 2006, 24 (1), 17.

Inventive Examples

Preparation of Intermediates

Preparation of Intermediate I1

0.25 mol (53 g) of butyl triglycol is added over 2 hours at 23° C. to 0.625 mol (108.75 g) toluene diisocyanate (TDI T65, a 65/35 mixture of 2,4-toluylene diisocyanate and 2,6-toluylene diisocyanate, Covestro AG). The temperature is held below 45° C. After the end of the addition, stirring is continued for 2.5 h. The excess isocyanate is removed by vacuum (0.1 mbar) distillation at from 150 to 170° C. The NCO content is 10.9 wt. %.

Preparation of Intermediate I2

The procedure described for Intermediate I1 was repeated using 0.4 mol (74.53 g) lauryl alcohol as the alcohol component and 0.8 mol (139.2 g) toluene diisocyanate (TDI T100, 2,4-toluylene diisocyanate, Covestro AG) as the isocyanate component. The temperature is held below 60° C. After the end of the addition, stirring is continued for 3 h. The excess isocyanate is removed by vacuum (0.1 mbar) distillation at from 150 to 170° C. The reaction product obtained is a waxy solid. The NCO content is 11.2 wt. %.

Preparation of Intermediate I3

The procedure described for Intermediate I1 was repeated using 0.4 mol (179.52 g) of a polyethylene glycol monomethyl ether with a hydroxyl number of 125 mg KOH/g as the alcohol component and 0.8 mol (139.2 g) toluene diisocyanate (TDI T80, a 80/20 mixture of 2,4-toluylene diisocyanate and 2,6-toluylene diisocyanate, Covestro AG) as the isocyanate component. The temperature is held between 50° C. and 55° C. After the end of the addition, stirring is continued for 3 h. The excess isocyanate is removed by vacuum (0.1 mbar) distillation at from 150 to 170° C. The NCO content is 7.0 wt. %.

The hydroxyl number was determined by acetylation of the free hydroxyl groups of the substance with acetic anhydride in pyridine solvent. After completion of the reaction, water was added, and the remaining unreacted acetic anhydride was converted to acetic acid and measured by titration with potassium hydroxide.

Preparation of Urea-Based Compound Solutions

Example E1

Preparation of Urea-Based Compound Solution E1

In a four-neck flask with stirrer 1.90 g lithium chloride was added to 53.10 g of N-methylcaprolactam under stirring. The mixture was heated up to 80° C. under nitrogen atmosphere. The lithium chloride was dissolved within 30 min under stirring. 6.68 g m-xylylenediamine were added and the mixture was homogenized. 38.32 g of the intermediate I1 were added dropwise under stirring within 30 min in such a way that the temperature does not exceed 85° C. Afterwards the mixture was stirred for 3 hours at 80° C. The result is a transparent, yellowish product (GPC: $M_n$=2069 g/mol; D=1.15).

Example E2

Preparation of Urea-Based Compound Solution E2

In a four-neck flask with stirrer 1.65 g lithium chloride was added to 75.00 g of N-methylcaprolactam under stirring. The mixture was heated up to 80° C. under nitrogen atmosphere. The lithium chloride was dissolved within 30 min under stirring. 3.55 g m-xylylenediamine were added and the mixture was homogenized. 19.80 g of the intermediate I2 were added dropwise under stirring within 30 min in such a way that the temperature does not exceed 85° C. Afterwards the mixture was stirred for 3 hours at 80° C. The result is a transparent, yellowish product (GPC: $M_n$=2386 g/mol; D=1.14).

Example E3

Preparation of Urea-Based Compound Solution E3

In a four-neck flask with stirrer 1.32 g lithium chloride was added to 48.00 g of N-methylcaprolactam under stirring. The mixture was heated up to 80° C. under nitrogen atmosphere. The lithium chloride was dissolved within 30 min under stirring. 5.66 g m-xylylenediamine were added and the mixture was homogenized. A homogenous mixture of 10.82 g of intermediate I1 and 34.2 g of intermediate I3 were added dropwise under stirring within 30 min in such a way that the temperature does not exceed 85° C. Afterwards the mixture was stirred for 3 hours at 80° C. The result is a transparent, yellowish product (GPC: $M_n$=2401 g/mol; D=1.13).

Example E4

Preparation of Urea-Based Compound Solution E4

In a four-neck flask with stirrer 2.30 g lithium chloride was added to 57.70 g of N-methylcaprolactam under stirring. The mixture was heated up to 80° C. under nitrogen atmosphere. The lithium chloride was dissolved within 30 min under stirring. 5.94 g m-xylylenediamine were added and the mixture was homogenized. 34.06 g of the intermediate I1 were added dropwise under stirring within 30 min in such a way that the temperature does not exceed 85° C. Afterwards the mixture was stirred for 3 hours at 80° C. The result is a transparent, yellowish product (GPC: $M_n$=2081 g/mol; D=1.16).

Example E5

Preparation of Urea-Based Compound Solution E5

In a four-neck flask with stirrer 1.90 g lithium chloride was added to 53.10 g of N-ethylcaprolactam under stirring. The mixture was heated up to 80° C. under nitrogen atmosphere. The lithium chloride was dissolved within 30 min under stirring. 6.68 g m-xylylenediamine were added and the mixture was homogenized. 38.32 g of intermediate I1 were added dropwise under stirring within 30 min in such a way that the temperature does not exceed 85° C. Afterwards the mixture was stirred for 3 hours at 80° C. The result is a transparent, yellowish product (GPC: $M_n$=2108 g/mol; D=1.14).

Example E6

Preparation of Urea-Based Compound Solution E6

In a four-neck flask with stirrer 1.32 g lithium chloride was added to 48.00 g of N-ethylcaprolactam under stirring. The mixture was heated up to 80° C. under nitrogen atmosphere. The lithium chloride was dissolved within 30 min under stirring. 5.66 g m-xylylenediamine were added and the mixture was homogenized. A homogenously mixture of 10.82 g of intermediate I1 and 34.20 g of intermediate I3 were added dropwise under stirring within 30 min in such a way that the temperature does not exceed 85° C. Afterwards the mixture was stirred for 3 hours at 80° C. The result is a transparent, yellowish product (GPC: $M_n$=2417 g/mol; D=1.13).

Example E7

Preparation of Urea-Based Compound Solution E7

In a four-neck flask with stirrer 1.90 g lithium chloride was added to 35.4 g N-methylcaprolactam and 17.7 g N-vinylcaprolactam under stirring. The mixture was heated up to 80° C. under nitrogen atmosphere. The lithium chloride was dissolved within 30 min under stirring. 6.68 g m-xylylenediamine were added and the mixture was homogenized. 38.32 g of the intermediate I1 was added dropwise under stirring within 30 min in such a way that the temperature does not exceed 85° C. Afterwards the mixture was stirred for 3 hours at 80° C. The result is a transparent, yellowish product (GPC: $M_n$=2170 g/mol; D=1.12).

Example E8

Preparation of Urea-Based Compound Solution E8

In a four-neck flask with stirrer 1.65 g lithium chloride was added to 25 g N-vinylcaprolactam and 50 g N-methylcaprolactam under stirring. The mixture was heated up to 80° C. under nitrogen atmosphere. The lithium chloride was dissolved within 30 min under stirring. 3.55 g m-xylylenediamine were added and the mixture was homogenized. 19.8 g of the intermediate I2 was added dropwise under stirring within 30 min in such a way that the temperature does not exceed 85° C. Afterwards the mixture was stirred for 3 hours at 80° C. The result is a transparent, yellowish product (GPC: $M_n$=1910 g/mol; D=1.26).

Example E9

Preparation of Urea-Based Compound Solution E9

In a four-neck flask with stirrer 1.32 g lithium chloride was added to 16 g N-vinylcaprolactam and 32 g N-methylcaprolactam under stirring. The mixture was heated up to 80° C. under nitrogen atmosphere. The lithium chloride was dissolved within 30 min under stirring. 5.66 g m-xylylenediamine were added and the mixture was homogenized. A homogenous mixture of 10.82 g of intermediate I1 and 34.20 g of intermediate I3 was added dropwise under stirring within 30 min in such a way that the temperature does not exceed 85° C. Afterwards the mixture was stirred for 3 hours at 80° C. The result is a transparent, yellowish product (GPC: $M_n$=2419 g/mol; D=1.14).

Example E10

Preparation of Urea-Based Compound Solution E10

In a four-neck flask with stirrer 1.65 g lithium chloride was added to 19.2 g N-vinylcaprolactam and 38.5 g N-methylcaprolactam under stirring. The mixture was heated up to 80° C. under nitrogen atmosphere. The lithium chloride was dissolved within 30 min under stirring. 5.94 g m-xylylenediamine were added and the mixture was homogenized. 34.06 g of the intermediate I1 was added dropwise under stirring within 30 min in such a way that the temperature does not exceed 85° C. Afterwards the mixture was stirred for 3 hours at 80° C. The result is a transparent, yellowish product (GPC: $M_n$=2118 g/mol; D=1.13).

Comparative Examples (not Inventive)

Comparative Example C1

The preparation was carried out according to example E1, but the same weight of N-methylbutyrolactam was used instead of N-methylcaprolactam.

Comparative Example C2

The preparation was carried out according to example E1, but the same weight of dimethyl sulfoxide was used instead of N-methylcaprolactam.

Comparative Example C3

The preparation was carried out according to example E3, but the same weight of N-methylbutyrolactam was used instead of N-methylcaprolactam.

Comparative Example C4

The preparation was carried out according to example E3, but the same weight of dimethyl sulfoxide was used instead of N-methylcaprolactam.

Comparative Example C5

The preparation was carried out according to example E3, but the same weight of N-butylbutyrolactam was used instead of N-methylcaprolactam.

Comparative Example C6

The preparation was carried out according to example E2, but the same weight of N-methylbutyrolactam was used instead of N-methylcaprolactam.

Comparative Example C7

The preparation was carried out according to example E2, but the same weight of methyl 5-(dimethylamino)-2-methyl-5-oxopentanoate was used instead of N-methylcaprolactam Application Test of the Rheology Additive Compositions

TABLE 1

Raw materials

| Name | Description | Manufacturer |
|---|---|---|
| Setal 1715 VX-74 | Saturated polyester grade | Allnex |
| Xylene | Isomeric mixture | Overlack AG |
| Aerosil R 972 | Hydrophobic fumed silica | Evonik Industries AG |
| Disperbyk-2150 | Solution of a block copolymer with basic, pigment-affinic groups | BYK-Chemie GmbH |
| Kronos 2160 | Titandioxide | Kronos Inc. |
| Setamine US 138 BB-70 | Amino Resin (Melamine, butylated) | Allnex |
| Butylglycolacetate | 2-Butoxy-ethylacetate | Oqema GmbH |
| Nacure 5225 | Amine neutralized dodecylbenzenesulfonic acid | King Industries Inc. |
| Shellsol A | Aromatic hydrocarbons | Shell Chemicals |
| BYK-358 N | Solution of a polyacrylate | BYK Chemie |

TABLE 1-continued

| Raw materials | | |
|---|---|---|
| Name | Description | Manufacturer |
| | | GmbH |
| Joncryl 8280 | Acrylic dispersion | BASF SE |
| Propylenglycol | 1,2-Propandiol | Dow Chemical |
| BYK-154 | Solution of an ammonium salt of an acrylate copolymer | BYK-Chemie GmbH |
| Kronos 2190 | Titan dioxide | Kronos Inc. |
| Butylglycol | 2-Butoxy-ethanol | BASF SE |
| Texanol | Isobutyric acid, ester with 2,2,4-trimethyl-1,3-pentanediol | Krahn Chemie GmbH |
| Ammonia | 32% solution of ammonia in water | Merck KGaA |
| Worléekyd S 365 | Long oil alkyd resin | Worlée |
| Testbenzin K30 | Hydrocarbons, C9-C12, n-alkanes, isoalkanes, cyclics, aromatics (2-25%) | Julius Hoesch GmbH & Co. KG |
| Nuodex Combi APB | Cobalt/Calcium/Zirconium drier combination | Venator Materials |
| BYK-066 N | Solution of foam-destroying polysiloxanes | BYK-Chemie GmbH |
| Borchi Nox M2 | Methyl ethyl ketoxime | Borchers |
| DI water | Deionized water | |

Test System 1: Polyester-Melamine White Coating Composition

Production of a polyester-melamine white coating composition using the formulation in table 2. Ingredients 1 to 5 were grinded with a Dispermat CV with 1 mm glass beads (weight ratio glass beads to mill base 1:1) for 30 min at 18 m/s at 40° C. Afterwards ingredients 6 to 12 were added and homogenized by stirring manually at 23° C. Subsequently, 100 g of the formulation was filled in 150 ml glass bottles. After the formulation is cooled down to room temperature (23° C.) an amount of the urea-based compound solution corresponding to 0.3 g of the urea-based compound became incorporated into the formulation under stirring with a Dispermat CV (Fa. Getzmann) for 2 min. at 1000 rpm, using a 4 cm diameter toothed plate. Afterwards the samples were stored at 23° C. for 24 hours. After that the low shear viscosity of the samples were measured on a rheometer Physica MCR 301 from Anton Paar with a 2.5 cm diameter 1° cone at a shear rate of 0.1 1/s at 23° C.

TABLE 2

| Polyester-Melamine white coating | | |
|---|---|---|
| 1 | Setal 1715 VX-74 | 10.0 g |
| 2 | Xylene | 4.0 g |
| 3 | Aerosil R 972 | 0.3 g |
| 4 | Disperbyk 2150 | 0.7 g |
| 5 | Kronos 2160 | 21.5 g |
| 6 | Setal1715 VX-74 | 32.0 g |
| 7 | Setamine US 138 BB-70 | 17.4 g |
| 8 | Butylglycolacetate | 3.6 g |
| 9 | Nacure 5225 | 0.4 g |
| 10 | Shellsol A | 7.1 g |
| 11 | Xylene | 2.8 g |
| 12 | BYK 358 N | 0.2 g |
| | total | 100.0 g |

Grinding: Dispermat CV, 30 min, 18 m/s, 40° C., 1 mm glass beads:mill base 1:1

TABLE 3

| Results | |
|---|---|
| Product | Viscosity [Pas] at 1/s |
| Without rheol. additive | 0.2 |
| Comparative Example C1 | 32.1 |
| Comparative Example C2 | 30.6 |
| Example E1 | 47.1 |
| Example E5 | 38.2 |

From the table 3 it is visible, that the comparison samples show a lower viscosity in the low shear rate range than the subject to concept samples.

The samples related to subject of concept are obviously better effective and are therefore better suitable to improve properties like anti-settling or anti-sagging where the low shear viscosity has a strong impact.

Test System 2: Acrylic Dispersion White Paint

Production of the acrylic dispersion white paint using the formulation in table 4. Ingredients 1 to 4 were grinded with a Dispermat CV with 1 mm glass beads (weight ratio glass beads to mill base 1:1) for 30 min at 18 m/s at 40° C. Afterwards ingredients 6 to 8 were added and homogenized by stirring manually at 23° C. Subsequently, 100 g of the formulation was filled in 150 ml glass bottles. After the formulation is cooled down to room temperature (23° C.) 0.8% of the active substance of the respective rheology additive became incorporated into the formulation under stirring with a Dispermat CV (Fa. Getzmann) for 5 min. at 1000 rpm, using a 4 cm diameter toothed plate. Afterwards the samples were stored at 23° C. for 24 hours. For the application, the samples were stirred with a spatula for homogenization and then applied with a stepped doctor blade Model 421/S (Erichsen GmbH & Co KG) with 30-300 μm wet film thickness. The application is done on contrast cards 2801 (BYK-Gardner GmbH) using the automatic applicator byko-drive XL (BYK-Gardner GmbH) with an application speed of 50 mm/s. Directly after application the draw down is hanged up vertical at 23° C. until it is dried. After drying, the visual evaluation of the sag resistance is done. Therefore, the wet film thickness is taken that shows after drying a clear separation of the draw down, no runner and also no bulge building between the applied film thickness.

TABLE 4

| Acrylic dispersion white paint | | |
|---|---|---|
| 1 | Propylenglycol | 5.6 g |
| 2 | BYK 154 | 0.6 g |
| 3 | DI water | 2.0 g |
| 4 | Kronos 2190 | 22.1 g |
| 5 | Butylglycol/Texanol 70:30 (w/w) | 3.1 g |
| 6 | Ammonia 25% in water | 0.3 g |
| 7 | DI water | 6.1 g |
| 8 | Joncryl 8280 | 60.2 g |
| | total | 100.0 g |

Grinding: Dispermat CV, 20 min, 18 m/s, toothed plate at 23° C.

TABLE 5

| Results | |
|---|---|
| Product | Sag resistance [µm] |
| Without rheological additive | <30 |
| Comparative Example C3 | 120 |
| Comparative Example C4 | 60 |
| Comparative Example C5 | 90 |
| Example E3 | 150 |
| Example E6 | 150 |

From the table 5 it is visible, that the comparison samples show a lower rheological effectiveness measured by sag resistance than the subject to concept samples. The samples related to subject of concept are obviously better suitable to improve the sag resistance than the comparison samples.

Test System 3: Long Oil Alkyd Clear Coat

Production of the long oil alkyd clear coat using the formulation in table 6. Subsequently, 100 g of the formulation was filled in 150 ml glass bottles and 0.8% of the active substance of the respective rheology additive became incorporated into the formulation under stirring with a Dispermat CV (Fa. Getzmann) for 5 min. at 1000 rpm, using a 4 cm diameter toothed plate. The samples were stored at 23° C. for 24 hours. After that the low shear viscosity of the samples were measured on a rheometer Physica MCR 301 from Anton Paar with a 2.5 cm diameter 1° cone at a shear rate of 0.1 1/s at 23° C.

TABLE 6

| Long oil alkyd clear coat | |
|---|---|
| Worléekyd S 365, 60% in Testbenzin K30 | 80.9 g |
| Testbenzin K30 | 13.7 g |
| Nuodex Combi APB | 4.9 g |
| Borchi Nox M2 | 0.3 g |
| BYK-066 | 0.2 g |
| Total | 100.0 g |

Addition of the single components under stirring with a Dispermat CV with 2000 rpm for 10 min.

TABLE 7

| Results | |
|---|---|
| Product | Viscosity [Pas] at 1/s |
| Without rheological additive | 0.8 |
| Comparative Example C6 | 3.4 |
| Comparative Example C7 | 3.4 |
| Example E2 | 6.6 |

From the table 7 it is visible, that the comparison samples show a lower viscosity in the low shear rate range than the subject to concept samples. The samples related to subject of concept are obviously better effective and are therefore better suitable to improve properties like anti-settling or anti-sagging where the low shear viscosity has a strong impact.

The invention claimed is:

1. A composition comprising one or more urea-based compounds (A) having a number average molecular weight (Mn) between 350 g/mol and 30000 g/mol, determined by gel permeation chromatography according to DIN 55672 part 2 (year 2016), wherein the urea-based compound is selected from the formulas (U-2a)

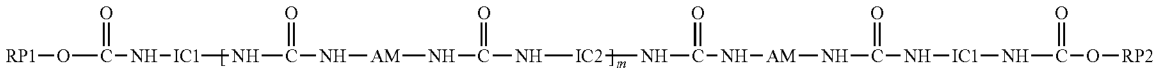

(U-2b)

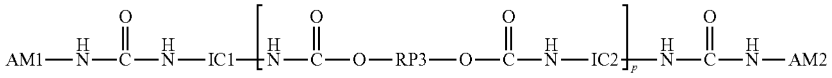

(U-2c)

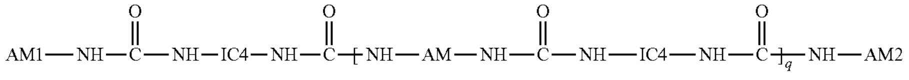

(U-2d)

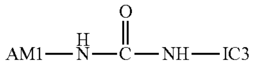

(U-2e)

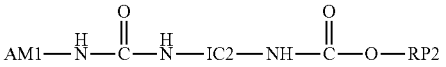

where

AM is selected from a linear or branched, saturated or unsaturated, aliphatic, cycloaliphatic, aromatic or aliphatic-aromatic organic radical having 2 to 50 C atoms, in case of multiple occurrence of AM, AM is independently selected from a linear or branched, saturated or unsaturated, aliphatic, cycloaliphatic, aromatic or aliphatic-aromatic organic radical having 2 to 50 C atoms, AM1 and AM2 independently of one another represent a linear or branched, saturated or unsaturated, aliphatic, aromatic or aliphatic-aromatic organic radical having 1 to 50 C atoms, in case of multiple occurrence of AM1 and AM2, AM1 and AM2 represent independently the radical described above for AM1 and AM2, IC1 and IC2 independently of one another represent a linear or branched, saturated or unsaturated, aliphatic, aromatic or aliphatic-aromatic hydrocarbon radical having 2 to 40 C atoms, in case of multiple occurrence of IC1 and IC2, IC1 and IC2 represent independently the radical described above for IC1 and IC2, IC3 represents a linear or branched, saturated or unsaturated, aliphatic, aromatic or aliphatic-aromatic hydrocarbon radical having 2 to 24 carbon atoms, in case of multiple occurrence of IC3, IC3 independently represents a linear or branched, saturated or unsaturated, aliphatic, aromatic or aliphatic-aromatic hydrocarbon radical having 2 to 24 carbon atoms, RP1 and RP2 independently of one another represent a linear or branched, saturated or unsaturated, aliphatic, aromatic or aliphatic-aromatic organic radical having 1 to 24 C atoms and/or a polyether radical having 1 to 120 ether oxygen atoms and/or a polyester radical having 1 to 100 ester groups and optionally containing ether groups, and/or a polyamide radical having 1 to 100 amide groups, and/or a polysiloxane radical having 3 to 100 silicon atoms, in case of multiple occurrence of RP1 and RP2, RP1 and RP2 represent independently the radicals described above for RP1 and RP2, RP3 represents a linear or branched, saturated or unsaturated, aliphatic, aromatic or aliphatic-aromatic organic radical having 2 to 24 C atoms and/or a (poly) ether radical having 1 to 120 ether oxygen atoms and/or a polyamide radical having 1 to 100 amide groups and/or a polysiloxane radical having 3 to 100 silicon atoms and/or a polyester radical having 1 to 100 ester groups and optionally containing ether groups, in case of multiple occurrence of RP3, RP3 independently represents the radicals described above for RP3, and m is an integer from 1 to 5, p represents 0 and/or 1, q is an integer from 0 to 20, and when the composition comprises a urea-based compound of formula (U-2a), at least 50 wt. % of all urea-based compounds in the composition are according to formula (U-2a), one or more N-substituted caprolactam derivatives (B) according to formula (I)

(I)

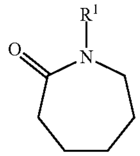

wherein $R^1$ is an organic group having 1 to 2 carbon atoms and wherein $R^1$ contains no oxygen atoms linked by single bonds, and wherein the caprolactam derivative comprises at least one of N-methylcaprolactam, N-ethylcaprolactam, N-acetylcaprolactam, and mixtures thereof.

2. The composition according to claim 1, wherein the composition further comprises one or more salts (D).

3. The composition according to claim 2, wherein the one or more salts (D) include one or more of a lithium salt, an ammonium salt, and a calcium salt.

4. The composition according to claim 1, comprising 20 to 55% by weight of the one or more urea-based compounds (A), 45 to 80% by weight of the one or more N-substituted caprolactam derivatives (B), wherein the % by weight are calculated on the sum of (A) and (B).

5. A liquid composition comprising the composition according to claim 1 and at least one of an organic diluent and water, the liquid composition being a liquid at 23° C., wherein the liquid composition comprises 0.02 to 6.00% by weight of the one or more urea-based compounds (A) and 0.05 to 8.00% by weight of the one or more N-substituted caprolactam derivatives (B), wherein the % by weight are calculated on the weight of the liquid composition.

6. The liquid composition according to claim 5, wherein the liquid composition comprises one or more of a coating composition, a clear coat composition, a lacquer, a varnish, a plastic formulation, a pigment paste, an effect pigment paste, a polymer formulation, a sealant formulation, a cosmetic formulation, a homecare formulation, an industrial care formulation, a perfume formulation, a fragrance formulation, a ceramic formulation, an adhesive formulation, a liquid formulation for use in gas and oil production, a composition for the manufacture of electrical components and circuits, a liquid formulation for use in energy storage media, a cleaning agent, a potting compound, a building material formulation, a lubricant, a filling compound, a wax emulsion, a metalworking fluid, a metal-processing product, a liquid composition in the form of a spraying agent, a deposition aid, a ink, a printing ink, a ink jet ink, a composition that may be used as corrosion protection in the field of marine and protective coatings, and mixtures thereof.

7. A process for controlling the rheology of a liquid composition, the process comprising:

Providing a first liquid composition; and

Mixing the composition according to claim 1 with the first liquid composition to form a second liquid composition comprising 0.02 to 6.00% by weight of the one or more urea-based compounds (A) and 0.05 to 8.00% by weight of the one or more N-substituted caprolactam derivatives (B), wherein the % by weight are calculated on the weight of the second liquid composition.

8. A coated article, wherein at least a part of the surface of the article is coated with the composition according to claim 5.

9. The composition of claim 3, the one or more salts (D) including one or more of a chloride salt, an acetate salt, and a nitrate salt.

10. The process according to claim 7, the first liquid composition being a non-aqueous composition.

11. The process according to claim 7, the first liquid composition being an aqueous composition.

12. The process according to claim 7, the first liquid composition being a paint composition.

13. The process according to claim 7, the first liquid composition being a coating composition.

14. A composition comprising one or more urea-based compounds (A) having a number average molecular weight (Mn) between 350 g/mol and 30000 g/mol, determined by gel permeation chromatography according to DIN 55672 part 2 (year 2016), wherein the urea-based compound is selected from the formulas (U-2a)

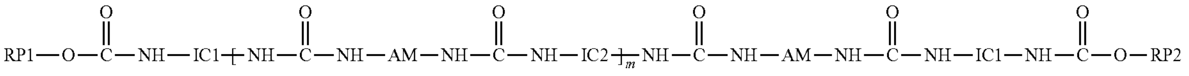

(U-2b)

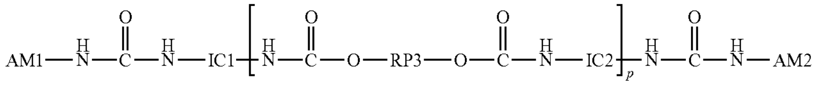

(U-2c)

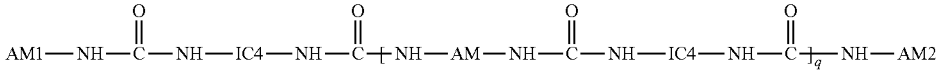

(U-2d)

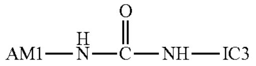

(U-2e)

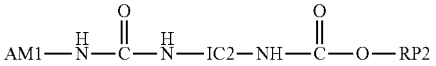

where

AM is selected from a linear or branched, saturated or unsaturated, aliphatic, cycloaliphatic, aromatic or aliphatic-aromatic organic radical having 2 to 50 C atoms, in case of multiple occurrence of AM, AM is independently selected from a linear or branched, saturated or unsaturated, aliphatic, cycloaliphatic, aromatic or aliphatic-aromatic organic radical having 2 to 50 C atoms, AM1 and AM2 independently of one another represent a linear or branched, saturated or unsaturated, aliphatic, aromatic or aliphatic-aromatic organic radical having 1 to 50 C atoms, in case of multiple occurrence of AM1 and AM2, AM1 and AM2 represent independently the radical described above for AM1 and AM2, IC1 and IC2 independently of one another represent a linear or branched, saturated or unsaturated, aliphatic, aromatic or aliphatic-aromatic hydrocarbon radical having 2 to 40 C atoms, in case of multiple occurrence of IC1 and IC2, IC1 and IC2 represent independently the radical described above for IC1 and IC2, IC3 represents a linear or branched, saturated or unsaturated, aliphatic, aromatic or aliphatic-aromatic hydrocarbon radical having 2 to 24 carbon atoms, in case of multiple occurrence of IC3, IC3 independently represents a linear or branched, saturated or unsaturated, aliphatic, aromatic or aliphatic-aromatic hydrocarbon radical having 2 to 24 carbon atoms, RP1 and RP2 independently of one another represent a linear or branched, saturated or unsaturated, aliphatic, aromatic or aliphatic-aromatic organic radical having 1 to 24 C atoms and/or a polyether radical having 1 to 120 ether oxygen atoms and/or a polyester radical having 1 to 100 ester groups and optionally containing ether groups, and/or a polyamide radical having 1 to 100 amide groups, and/or a polysiloxane radical having 3 to 100 silicon atoms, in case of multiple occurrence of RP1 and RP2, RP1 and RP2 represent independently the radicals described above for RP1 and RP2, RP3 represents a linear or branched, saturated or unsaturated, aliphatic, aromatic or aliphatic-aromatic organic radical having 2 to 24 C atoms and/or a (poly) ether radical having 1 to 120 ether oxygen atoms and/or a polyamide radical having 1 to 100 amide groups and/or a polysiloxane radical having 3 to 100 silicon atoms and/or a polyester radical having 1 to 100 ester groups and optionally containing ether groups, in case of multiple occurrence of RP3, RP3 independently represents the radicals described above for RP3, and m is an integer from 1 to 5, p represents 0 and/or 1, q is an integer from 0 to 20, and when the composition comprises a urea-based compound of formula (U-2a), at least 50 wt. % of all urea-based compounds in the composition are according to formula (U-2a), one or more N-substituted caprolactam derivatives (B) according to formula (I)

(I)

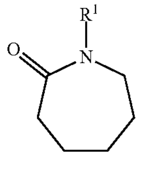

wherein $R^1$ is an organic group having 1 to 2 carbon atoms and wherein $R^1$ contains no oxygen atoms linked by single bonds, and wherein the caprolactam derivative comprises at least one of N-methylcaprolactam, N-ethylcaprolactam, N-acetylcaprolactam, and mixtures thereof, and wherein the one or more urea-based compounds (A) comprise molecules containing at least four urea groups.

* * * * *